(12) United States Patent
Boudjemaa et al.

(10) Patent No.: US 10,084,194 B2
(45) Date of Patent: Sep. 25, 2018

(54) ELECTRICAL INSTALLATION HAVING A COOLED FUEL CELL COMPRISING AN ABSORPTION HEAT ENGINE

(71) Applicant: SNECMA, Paris (FR)

(72) Inventors: Fabien Boudjemaa, Garches (FR); Omar Hafsaoui, Elbeuf (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 570 days.

(21) Appl. No.: 14/442,868

(22) PCT Filed: Nov. 6, 2013

(86) PCT No.: PCT/FR2013/052651
§ 371 (c)(1),
(2) Date: May 14, 2015

(87) PCT Pub. No.: WO2014/076389
PCT Pub. Date: May 22, 2014

(65) Prior Publication Data
US 2015/0311542 A1    Oct. 29, 2015

(30) Foreign Application Priority Data
Nov. 16, 2012  (FR) ...................................... 12 60914

(51) Int. Cl.
*H01M 8/04* (2016.01)
*H01M 8/04007* (2016.01)
(Continued)

(52) U.S. Cl.
CPC ... *H01M 8/04074* (2013.01); *H01M 8/04029* (2013.01); *H01M 8/04037* (2013.01);
(Continued)

(58) Field of Classification Search
CPC .................................. H01M 8/04007–8/04074
See application file for complete search history.

(56) References Cited

U.S. PATENT DOCUMENTS

| 2002/0172846 A1* | 11/2002 | Hagan | ..................... F02G 5/02 |
| | | | 429/423 |
| 2005/0022550 A1* | 2/2005 | Yoshii | .............. H01M 8/04014 |
| | | | 62/438 |
| 2012/0122002 A1 | 5/2012 | Kamat et al. | |

FOREIGN PATENT DOCUMENTS

| FR | 2 832 786 A1 | 5/2003 |
| JP | H04-169073 A | 6/1992 |

(Continued)

OTHER PUBLICATIONS

Search Report dated Jan. 7, 2014, in corresponding International Application No. PCT/FR2013/052651, filed on Nov. 6, 2013 (2 pages).

(Continued)

*Primary Examiner* — Stephan J Essex
(74) *Attorney, Agent, or Firm* — Bookoff McAndrews, PLLC

(57) ABSTRACT

The invention relates to an installation (100) comprising:
  a power module having a fuel cell (12) and a reformer (14a), the fuel cell including a heat removal loop (24); and
  an absorption heat engine (40) having a first boiler (42), a condenser (46), an evaporator (48), and an absorber (50).

According to the invention, a heat exchange circuit (42a) of the first boiler is inserted in the heat removal loop of the fuel cell.

Furthermore, in the invention, the installation has a closed liquid circuit (10), which circuit comprises at least one heat exchanger (26, 28, 30, 32) having a heating circuit thermally (Continued)

coupled to the power module and a heated circuit inserted in said circulation circuit, said circulation circuit exchanging heat with said heating circuit, heating the liquid of the circulation circuit.

Finally, in the invention, a heat exchange circuit (48a) of the evaporator is inserted in said closed liquid circulation circuit.

18 Claims, 1 Drawing Sheet

(51) Int. Cl.
*H01M 8/04029* (2016.01)
*H01M 8/04701* (2016.01)
*H01M 8/0612* (2016.01)
*H01M 8/1018* (2016.01)

(52) U.S. Cl.
CPC ... *H01M 8/04052* (2013.01); *H01M 8/04059* (2013.01); *H01M 8/04738* (2013.01); *H01M 8/0618* (2013.01); *H01M 2008/1095* (2013.01); *H01M 2250/20* (2013.01); *H01M 2250/40* (2013.01); *Y02E 60/56* (2013.01); *Y02T 90/32* (2013.01)

(56) References Cited

FOREIGN PATENT DOCUMENTS

| JP | H08-148166 A | 6/1996 |
|---|---|---|
| JP | 2000-048843 A | 2/2000 |
| JP | 2003-123791 A | 4/2003 |
| JP | 2009-515310 A | 4/2004 |
| JP | 2008-091096 A | 4/2008 |
| JP | 2011-153758 A | 8/2011 |
| WO | WO 2007/114802 A1 | 10/2007 |

OTHER PUBLICATIONS

Translation of Decision of Final Rejection issued in corresponding Japanese Patent Application No. 2015-542328, dated Mar. 6, 2018 (6 pages).

* cited by examiner

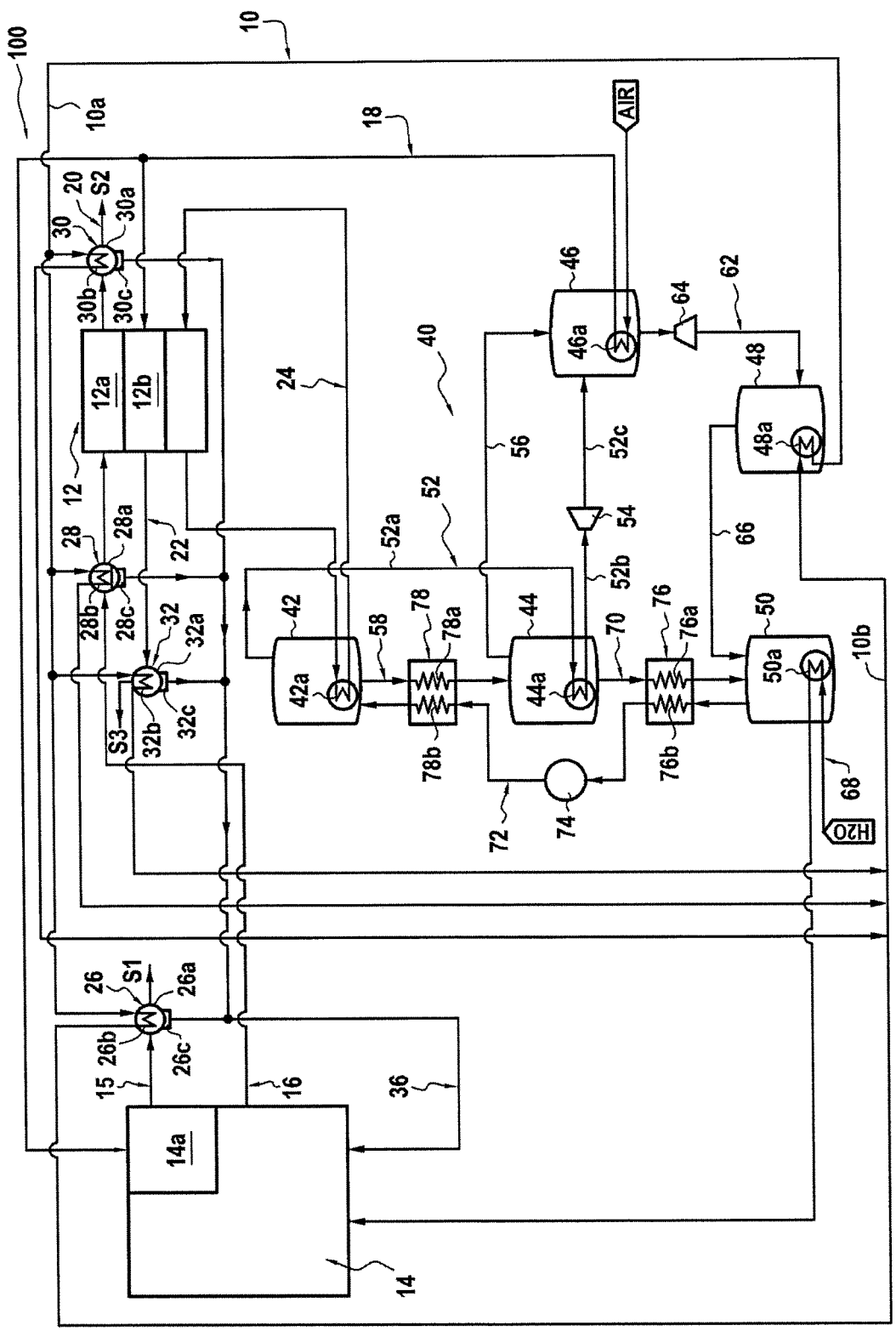

US 10,084,194 B2

ELECTRICAL INSTALLATION HAVING A COOLED FUEL CELL COMPRISING AN ABSORPTION HEAT ENGINE

This application is the U.S. national phase entry under 35 U.S.C. § 371 of International Application No. PCT/FR2013/052651, filed on Nov. 6, 2013, which claims priority to French Patent Application No. FR 1260914, filed on Nov. 16, 2012, the entireties of each of which are incorporated by reference herein.

FIELD OF THE INVENTION

The present invention provides an installation having a power module for delivering electricity that gives off heat and that needs to be cooled.

More particularly, the present invention relates to an installation having a power module with at least one fuel cell having an anode and a cathode, and at least one reformer that supplies hydrogen to the anode.

The installation of the invention is particularly adapted to be an on-board installation, in particular on board an aircraft such as an airplane.

STATE OF THE PRIOR ART

Such a power module giving off heat needs to be cooled in order to guarantee it operates properly. In particular, the fuel cell needs to be maintained at its proper operating temperature.

An installation having a power module and a system for cooling such a power module is known. The cooling system of such an installation has a closed circulation loop for circulating a fluid that exchanges heat with the power module, thereby having the effect of heating said liquid. The heated liquid is then cooled by passing through a radiator coupled to a fan blowing outside air. That cooling system also has a loop for removing the heat generated specifically by the fuel cell and incorporated therewith. Thus, as in the liquid circulation loop, the heat given off specifically by the fuel cell is extracted by a liquid circulating in the loop for removing the heat generated specifically by said fuel cell and exchanged via a radiator that is coupled to a fan blowing outside air.

Such a cooling system involving at least one radiator coupled to a fan for cooling the liquid is bulky. That makes it difficult for it to be installed as an on-board system.

Furthermore, the cooling system is of low efficiency, and as a result it degrades the efficiency of the power module.

In addition, the performance of the cooling system depends on the temperature difference between the outside air blown by the fan and the above-mentioned liquid of said circulation loop and of said heat removal loop. In certain circumstances, this temperature difference may be limited, in particular when the installation is situated in a hot zone, e.g. in a hot country.

Furthermore, in that installation, the heat exchanged between the circulation loop and the hot zones of the module is lost and is not used as an auxiliary energy source. The same applies to the heat generated specifically by the fuel cell and exchanged with said loop for removing heat generated specifically by the fuel cell.

Also known from Document WO 2007/114802, is an absorption heat engine inserted in a circuit for removing heat specific to a fuel cell.

SUMMARY OF THE INVENTION

An object of the present invention is to remedy the above-mentioned drawbacks, at least substantially.

The invention achieves this object by proposing an installation comprising:

a power module supplying electricity and giving off heat, the power module comprising at least one fuel cell provided with an anode and a cathode, and at least one reformer, the anode being fed with hydrogen by the reformer and the cathode being fed with oxygen, the fuel cell including a heat removal loop;

an absorption heat engine having a first boiler, a condenser, an evaporator, and an absorber, a heat exchange circuit of the first boiler being inserted in the heat removal loop of the fuel cell in order to cool it; and a closed liquid circulation circuit, said circulation circuit comprising at least one heat exchanger having a heating circuit thermally coupled to the power module and a heated circuit inserted in said circulation circuit, said circulation circuit exchanging heat with said heating circuit, thereby heating the liquid of the circulation circuit, and a heat exchange circuit of the evaporator being inserted in said closed liquid circulation circuit, said heat exchange circuit of the evaporator having said heated liquid of the circulation circuit passing therethrough after it has passed through the heated circuit of said heat exchanger in order to cool the heated liquid of said circulation circuit.

It can be understood that the absorption heat engine having the first boiler, the condenser, the evaporator, and the absorber, is itself known. The first boiler, the condenser, the evaporator, and the absorber are heat exchangers that exchange specific heat, i.e. they serve to transfer thermal energy (heat) from one fluid to another.

Furthermore, it can be understood that the "first boiler" means that the absorption heat engine is not limited to only one boiler but may, for example, have another boiler, as described below.

The absorption heat engine operates in particular as a result of the ability of certain fluids to absorb or desorb vapor. The heat engine thus uses as "working fluids" a binary mixture in which one of the fluids is more volatile than the other, which is referred to as "refrigerant fluid".

Furthermore, it can be understood that the loop for removing heat from the fuel cell has a heat-transfer fluid that extracts the heat generated specifically by the fuel cell while it is in operation. It can thus be understood that the heat-transfer fluid that has extracted the heat given off by the fuel cell passes through the heat exchange circuit of the first boiler of the absorption heat engine where it yielded the extracted heat to a mixture of a refrigerant fluid and of an absorbent contained in the first boiler (in the present description, the term "heat exchanger" is used to mean a circuit in which there flows a fluid that yields or absorbs heat).

This has the effect of boiling or desorbing a portion of the refrigerant fluid, which is then sent to the condenser in order to be condensed by heat exchange with a lower-temperature fluid flowing in a heat exchange circuit of the condenser, thereby producing liquid refrigerant fluid. The absorbent-rich mixture that remains in the first boiler is fed to the absorber.

The liquid refrigerant fluid leaving the condenser then passes through an evaporator in order to be evaporated by heat exchange with a hotter fluid flowing in the heat exchange circuit of the evaporator. This refrigerant fluid vapor leaving the evaporator then passes through the absorber where it is absorbed by the absorbent-rich mixture coming from the first boiler, which then becomes loaded with refrigerant fluid. The heat given off by this exothermic reaction is transferred to a fluid flowing in a heat exchange circuit of the absorber. This results in the absorber containing an absorbent-poor solution that is then fed to the first boiler.

These provisions enable the fuel cell to be cooled and maintained at its optimum operating temperature.

In this description, said heat exchanger, also referred to as an "exchanger", is itself known. As mentioned above, it is a device serving to transfer thermal energy (heat) from one fluid to another.

The term "heating circuit" is used herein to mean a circuit in which a hot fluid flows in order to yield heat energy. Herein, the term "heated circuit" is thus used to mean a circuit in which a cold fluid flows in order to receive heat energy from said hot fluid flowing in the heating circuit.

Furthermore, the term "thermally coupled" is used herein to mean that the heating circuit is incorporated in a circuit for hot fluid coming from the power module, such as a feed fluid for the fuel cell and/or the reformer, or indeed an exhaust fluid from the fuel cell and/or the reformer, etc., and the hot fluid passes through the heating circuit.

It can thus be understood that the hot fluid flowing in the heating circuit of said heat exchanger transfers heat to the liquid of the circulation circuit flowing in the heated circuit of said heat exchanger. This has the effect of cooling the hot fluid coming from the power module and of heating the liquid of the circulation circuit, referred to below as the "heated liquid of the circulation circuit".

It can also be understood that the heated liquid of the circulation circuit constitutes the above-mentioned hotter liquid flowing in the heat exchange circuit of the evaporator. It can thus be understood that this hot liquid flowing in the heat exchange circuit of the evaporator yields heat to the liquid refrigerant fluid contained in the evaporator and coming from the condenser. At the outlet from the heat exchange circuit of the evaporator, the liquid of the circulation circuit is at a lower temperature and is taken to the heated circuit of said heat exchanger in order to exchange heat with said heating circuit of said heat exchanger.

Because of these provisions, the power module is cooled in order to ensure that it operates properly.

Furthermore, these provisions minimize the size and the weight of the installation.

These provisions also make it possible to dissipate more heat power than in a prior art installation, where a radiator coupled to a fan blowing air is used to cool the liquid flowing in the loop for removing the heat specifically generated by the fuel cell. This is due to the fact that in an absorption heat engine the refrigerant fluid circulates in a closed circuit where the latent heat of the refrigerant fluid (quantity of heat exchanged when the refrigerant fluid changes state) is used for operating the absorption heat engine. A fluid picks up more energy per unit weight on changing state than when its temperature rises because of sensible heat (heat exchange without change of phase of the fluid), as takes place in the prior art installation in which the heat generated specifically by the fuel cell is exchanged with air blown by a fan.

In addition, because of these provisions, the installation is less subjected to outside temperatures than is said prior art device having a radiator coupled to a fan blowing air. Since the operation of the absorption heat engine depends mainly on the heat energy delivered to the absorber, outside conditions have little or no effect on its efficiency.

Furthermore, in the installation of the invention, the liquid of the circulation circuit circulates in a closed circuit and is cooled by transferring heat to the evaporator after passing though the heated circuit of said heat exchanger. The cooling of the liquid of the circulation circuit therefore does not depend on outside conditions.

Thus, the installation of the invention is made independent of its environment.

Finally, because of these provisions, the energy efficiency of the power module (co-generation of electricity and heat) is optimized, since the heat generated by the power module is used for operating the absorption heat engine. This heat energy is thus used for cooling the liquid of the circulation circuit after it has passed through the heated circuit of said heat exchanger. This cooled liquid then feeds the heated circuit of said heat exchanger in order to exchange heat with the heating circuit of said heat exchanger.

In addition, the condenser of the absorption heat engine has a heat exchange circuit that is inserted in a circuit for feeding air to the cathode and/or to the reformer, in order to heat that air.

It can be understood that the above-mentioned lower-temperature fluid flowing in the heat exchange circuit of the condenser is air. This air may come for example from the outside environment and it absorbs heat from the vapor of the refrigerant fluid, thereby having the effect of heating the air.

Because of these provisions, heat energy is recovered for heating the air that is fed to the cathode and also to the reformer, and in particular to the burner of said reformer.

In certain embodiments, the absorber of the absorption heat engine has a heat exchange circuit that is inserted in a circuit for feeding water to the reformer in order to heat that water.

It can be understood that in operation the reformer needs to be fed with water, preferably hot water or steam. In this example, the reformer reforms steam by performing a catalytic reaction at high temperature (about 800° C.) between a fuel and the water (steam), thereby producing a gas rich in hydrogen. This reaction is generally followed by a second catalytic reaction, namely reacting gas with steam so as to convert carbon monoxide and steam into hydrogen and carbon dioxide.

Thus, the above-mentioned fluid flowing in the heat exchange circuit of the absorber is water, specifically cold water in this example. On vaporizing, the cold water "picks up" heat by heat transfer from the refrigerant fluid vapor leaving the evaporator and injected into the absorber. The water vaporized in this way feeds the reformer.

In certain embodiments, the absorption heat engine is a double-effect absorption heat engine, said double-effect absorption heat engine having a second boiler.

Such a double-effect absorption heat engine is itself known.

This double-effect absorption heat engine having the second boiler differs from the absorption heat engine having only the first boiler in that the second boiler is fed by the absorbent-rich mixture that remains in the first boiler and in that the vapor of the refrigerant fluid leaving the first boiler passes through a heat exchange circuit of said second boiler. The vapor of the refrigerant fluid leaving the first boiler thus exchanges heat with the absorbent-rich mixture coming from the first boiler. That then has the effect of boiling or desorbing the remainder of the refrigerant fluid of the absorbent-rich mixture coming from the first boiler. The refrigerant fluid vapor as generated in this way in the second boiler is fed to the condenser. This also has the effect of condensing the refrigerant fluid vapor coming from the first boiler and passing through the heat exchange circuit of the second boiler. The refrigerant fluid liquid as obtained in this way at the outlet from the heat exchange circuit of the second boiler is expanded prior to feeding the condenser. In addition, the absorbent-rich solution that remains in the second boiler is fed to the absorber.

This provision makes it possible to make use twice of the heat given off by the operation of the fuel cell. It can thus be understood that this provision makes it possible to optimize the energy efficiency of the power module. This double-effect heat engine makes it possible to obtain a coefficient of performance (COP) greater than 1.

In certain embodiments, the heating circuit of such a heat exchanger is connected to a circuit for exhausting gas from a burner of the reformer. For example, the heat exchanger is a condenser.

In the present description, the condenser is itself known and constitutes a heat exchanger serving to condense a gas and recover a corresponding condensate liquid. By way of example, the liquid is water. It can be understood that the burner of the reformer ejects hot burnt combustion gas. The hot combustion gas flows in the heating circuit of the heat exchanger and exchanges heat with the liquid of the circulation circuit flowing through the heated circuit of the heat exchanger, thereby heating said liquid. This heated liquid of the circulation circuit then feeds the heat exchange circuit of the evaporator, and leaves said heat exchange circuit of the evaporator at a lower temperature.

Furthermore, in the present description, since the reformer reforms steam, the water contained in the burnt gas is recovered in order to be reinjected into the reformer.

In certain embodiments, the heating circuit of such a heat exchanger is connected to an anode feed circuit between the reformer and the anode. In a variant, such a heat exchanger is a condenser.

It can be understood that the reformer produces hot gas that is rich in hydrogen. Thus, in order to avoid damaging the fuel cell, the hydrogen-rich gas needs to be cooled and the water it contains needs to be eliminated prior to feeding the anode. For this purpose, this hydrogen-rich gas passes through the heating circuit of the heat exchanger to exchange heat with the liquid of the circulation circuit flowing through the heated circuit of the heat exchanger and to condense the water it contains, thereby heating said liquid of the circulation circuit. This heated liquid of the circulation circuit is then fed to the heat exchange circuit of the evaporator and leaves said heat exchange circuit of the evaporator at a lower temperature. Furthermore, the condensed water is returned, as above, to the reformer.

In certain embodiments, the heating circuit of such a heat exchanger is connected to a circuit for exhausting anode fluid and connected to the anode. In a variant, such a heat exchanger is a condenser.

It can be understood that the gas exhausted from the anode passes through the heating circuit of the heat exchanger to exchange heat with the liquid of the circulation circuit flowing in the heated circuit of said heat exchanger, thereby heating said liquid. This heated liquid of the circulation circuit then feeds the heat exchange circuit of the evaporator and leaves said heat exchange circuit of the evaporator at a lower temperature. Furthermore, the water of this gas is recovered to feed the reformer.

In certain embodiments, the heating circuit of such a heat exchanger is connected to a circuit for exhausting cathode fluid and connected to the cathode. In a variant, such a heat exchanger is a condenser.

It can be understood that the gas exhausted from the cathode passes through the heating circuit of the heat exchanger to exchange heat with the liquid of the circulation circuit flowing in the heated circuit of the heat exchanger, thereby heating said liquid. This heated liquid of the circulation circuit is then fed to the heat exchange circuit of the evaporator, and leaves said heat exchange circuit of the evaporator at a lower temperature. In addition, the water from this gas is recovered to feed the reformer.

In certain embodiments, a condensate liquid recovered in such a condenser feeds the reformer via a condensate circuit.

As mentioned above, the reformer acts by reforming steam and needs to be fed with water. It can thus be understood that the water recovered in the or each condenser constitutes the condensate and feeds the reformer.

In certain embodiments, the fuel cell is a high temperature proton exchange membrane fuel cell.

This type of fuel cell presents the advantage of accepting a hydrogen-rich gas as produced by a reformer for feeding its anode and of accepting oxygen coming from outside air for feeding its cathode.

In addition, this type of fuel cell is suitable for co-generation. During nominal operation, it delivers about as much heat power as electrical power.

In certain embodiments, the installation is an on-board installation.

The invention also provides an aircraft including an installation as described above.

Several embodiments are described in the present description. Nevertheless, unless specified to the contrary, characteristics described with reference to any one embodiment may be applied to any other embodiment.

BRIEF DESCRIPTION OF THE DRAWING

The invention and its advantages can be better understood on reading the following detailed description of an embodiment of the invention given by way of non-limiting example. The description refers to the sole accompanying FIGURE, in which:

FIG. 1 is a diagram of an installation with a power module of the invention.

DETAILED DESCRIPTION OF EMBODIMENTS

FIG. 1 shows an installation 100 essentially comprising a power module that gives off heat and a closed circuit 10 for circulating a liquid, referred to below as a "circulation circuit 10". In this example, the liquid in the circulation circuit 10 is water.

In the present description, the installation 100 is on board an aircraft such as an airplane. Thus, in this example, the water of the circulation circuit 10 comes from a water supply of the airplane.

The power module comprises a fuel cell 12 having an anode 12a and a cathode 12b. The power module also comprises a reformer 14 having a burner 14a producing a hot gas that is rich in hydrogen. In this example, the reformer 14 performs steam reforming, which consists in a catalytic reaction at high temperature (about 800° C.) between a fuel and water (steam), producing a gas that is rich in hydrogen. This reaction is generally followed by a second catalytic reaction, namely reacting gas in water (steam), which converts carbon monoxide and water (steam) into hydrogen and carbon dioxide. Hot combustion gas resulting from these reactions, and referred to below in the present description as "burnt" gas, is ejected by the burner out from the airplane via an outlet S1, after passing through a circuit 15 for exhausting gas from the burner.

Furthermore, in this example, the fuel cell 12 is a fuel cell having a high temperature proton exchange membrane that, in nominal operation, delivers almost as much heat power as electrical power. This type of cell 12 presents the advantage of accepting an anode feed of hydrogen-rich gas produced by the reformer 14 through an anode feed circuit 16 connecting an outlet of the reformer 14 to an inlet of the anode 12a. This type of cell 12 also accepts a cathode feed of oxygen taken from the outside air.

This outside air is taken by means of a circuit 18 for feeding air to the cathode 12b and to the burner 14a of the reformer 14. In addition, this feed circuit 18 also feeds the reformer 14 and more precisely its burner 14a.

An exhaust circuit 20 for exhausting anode gas, i.e. gas leaving the anode 12a, connects an outlet of the anode 12a to the outside of the airplane via an outlet S2 to exhaust said gas. In addition, an exhaust circuit 22 for exhausting cathode gas, i.e. the gas leaving the cathode 12b, connects an outlet of the cathode 12b to the outside of the airplane in order to exhaust this gas via an outlet S3.

The fuel cell 12 has a loop 24 for removing heat generated by the operation of said cell 12. In this example, a heat-transfer fluid circulates in said loop 24 and extracts the heat generated by the operation of the fuel cell.

The installation 100 also has four heat exchangers 26, 28, 30, and 32 which, in this example, are condensers. In a variant, the installation 100 could have a greater or smaller number of heat exchangers and/or condensers.

Each condenser 26, 28, 30, and 32 has a heating circuit 26a, 28a, 30a, or 32a that is thermally coupled to the power module, i.e. the heating circuit is incorporated in a circuit for hot fluid coming from the power module, such as a feed fluid for the cell 12 or indeed an exhaust fluid from the cell 12 and/or from the reformer 14, etc. Thus, the heating circuits 26a, 28a, 30a, and 32a are connected respectively to the circuit 15 for exhausting burnt gas from the burner 14a, to the anode feed circuit 16, to the circuit 20 for exhausting anode gas, and to the circuit 22 for exhausting cathode gas.

Furthermore, each condenser 26, 28, 30, and 32 has a respective heated circuit 26b, 28b, 30b, or 32b that is inserted in the water circulation circuit 10. It should be understood that the term "inserted" means that the water in the circulation circuit 10 flows through each of the heated circuits 26b, 28b, 30b, and 32b. In addition, the heated circuits 26b, 28b, 30b, and 32b are inserted in parallel relative to one another in the water circulation circuit 10 between a first water pipe 10a and a second water pipe 10b of said circulation circuit 10.

Furthermore, each condenser 26, 28, 30, and 32 has a condensed water tank 26c, 28c, 30c, or 32c. This recovered condensed water is injected into the reformer 14 by a condensate circuit 36.

In order to control the internal temperature of the fuel cell 12 and thus ensure that it operates properly, the fuel cell needs to be cooled. In this example, since the cell 12 is of the high temperature proton exchange membrane type, its temperature needs to be maintained at around 170° C. For this purpose, the installation has an absorption heat engine 40, which is a double-effect heat engine in this example. This double-effect absorption heat engine 40 is itself known and is referred to below as a "heat engine".

The structure of the heat engine 40 is described in the following portion of the description. The terms "upstream" and "downstream" are defined relative to the normal flow direction of a cooling fluid and/or of an absorbent through an absorption heat engine.

It essentially comprises a first boiler 42 having a mixture of a cooling fluid and an absorbent. The cooling fluid in this example is water and the absorbent is lithium bromide. This mixture contained in the first boiler 42 is referred to below as being "diluted" or "absorbent-poor".

The heat engine 40 also has a second boiler 44, a condenser 46, an evaporator 48, and an absorber 50.

Furthermore, in this absorption heat engine 40:
a heat exchange circuit 42a of the first boiler 42 is inserted in the heat removal circuit 24 of the fuel cell 12;
a first refrigerant circuit 52 comprising three sub-circuits 52a, 52b, and 52c connects the first boiler 42 to the condenser 46;
a heat exchange circuit 44a of the second boiler 44 is inserted in the first refrigerant circuit 52;
a first expander 54 is inserted in the first refrigerant circuit 52 downstream from the heat exchange circuit 44a of the second boiler 44 and upstream of the condenser 46;
a second refrigerant circuit 56 connects the second boiler 44 to the condenser 46;
a feed circuit 58 of the second boiler 44 connects the first boiler 42 to the second boiler 44;
a heat exchange circuit 46a of the condenser 46 is inserted in a feed circuit 18 for feeding air to the cathode and to the burner 14a of the reformer 14;
a third refrigerant circuit 62 connects the condenser 46 to the evaporator 48;
a second expander 64 is inserted in the third refrigerant circuit 62, downstream from the condenser 46 and upstream of the evaporator 48;
a heat exchange circuit 48a of the evaporator 48 is inserted in the water circulation circuit 10 downstream from the heated circuit 26b, 28b, 30b, or 32b of each heat exchanger 26, 28, 30, or 32;
a fourth refrigerant circuit 66 connects the evaporator 48 to the absorber 50;
a heat exchange circuit 50a of the absorber 50 is inserted in a circuit 68 for feeding water to the reformer 14, this circuit 68, in this example, taking its source from a supply of cold water;
a feed circuit 70 for feeding an absorbent-rich mixture connects the second boiler 44 to the absorber 50; and
a feed circuit 72 of the first boiler 42 connects the absorber 50 to the first boiler 42 via a pump 74 connected to the feed circuit 72 of the first boiler 42 downstream from the absorber 50 and upstream of the first boiler 42.

This heat engine 40 also has a first heat exchanger 76 comprising a first heat exchange circuit 76a inserted in the circuit 70 for the absorbent-rich mixture, and a second heat exchanger circuit 76b inserted in the feed circuit 72 of the first boiler 42.

The heat engine 40 also has a second heat exchanger 78 having a first heat exchange circuit 78a inserted in the feed circuit 58 of the second boiler 44, and a second heat exchange circuit 78b inserted in the feed circuit 72 of the first boiler 42.

The operation of the installation 100 of the invention is described below.

In order to recover water for feeding the reformer 14, the heating circuit 26a of the burnt gas condenser 26 is connected to the circuit 15 for exhausting gas from the burner 14a. The burnt gas ejected from the burner 14a passes through said heating circuit 26a exchanging heat with the heated circuit 32b of the burnt gas condenser 26 through which the water of the circulation circuit 10 circulates. Furthermore, the condensed water contained in the burnt gas is recovered in the tank 26c of said burnt gas condenser 26 and feeds the reformer 14 via the condensate circuit 36.

In like manner to the above, water is recovered from the hydrogen-rich hot gas leaving the reformer 14 by the anode feed circuit 16 and for reinjecting into the reformer 14. Furthermore, this hydrogen-rich gas leaving the reformer 14 needs to be cooled and dehydrated prior to feeding the anode 12a. For this purpose, the heating circuit 28a of the pre-anode condenser 28 is connected to the anode feed circuit 16. As a result, the hydrogen-rich gas leaving the reformer 14 passes through the heating circuit 28a of the pre-anode condenser 28 and exchanges heat with the heated circuit 28b of said condenser 28 through which the water of the circulation circuit 10 circulates. The condensation water recovered in the tank 28c of the pre-anode condenser 28 is injected into the reformer 14 by the condensate circuit 36.

The water contained in the gas exhausted from the anode 12a is also recovered. For this purpose, the heating circuit 30a of the post-anode condenser 30 is connected to the anode gas exhaust circuit 20. The hot fluid leaving the anode 12a passes through the heating circuit 30b of the post-anode condenser 30 and exchanges heat with the heated circuit 30b of the post-anode condenser 30 through which the water of the circulation circuit circulates. As above, the condensed water recovered in the tank 30c of the post-anode condenser 30 is injected into the reformer 14 by the condensate circuit 36.

Finally, the water contained in the gas exhausted from the cathode 12b is recovered. Thus, the heating circuit 32a of the post-cathode condenser 32 is connected to the cathode gas exhaust circuit 22. The hot fluid leaving the cathode 12b passes through the heating circuit 38a of the post-cathode condenser 32 and exchanges heat with the heated circuit 38b of the post-cathode condenser 32 through which water of the circulation circuit circulates. The condensation water recovered in the tank 32c of said post-cathode condenser 32 is returned to the reformer 14 by the condensate circuit 36.

It can thus be understood that the water of the circulation circuit 10 leaving each heated circuit 26b, 28b, 30b, or 32b is heated and referred to below as "hot water".

Furthermore, as mentioned above, the fuel cell 12 needs to be cooled.

For this purpose, the heat exchange circuit 42a of the first boiler 42 is inserted in the loop 24 for removing heat from the fuel cell 12.

Thus, the heat-transfer fluid of said loop 24 that has extracted the heat generated by the operation of the fuel cell 12 exchanges this heat with the mixture of refrigerant fluid and absorbent (referred to below as "dilute" or "absorbent-poor") contained in the first boiler 42.

This then has the effect of boiling or desorbing a portion of the refrigerant fluid of the dilute mixture contained in the first boiler 42. Since the mixture remaining in the first boiler 42 has "lost" water, it is referred to as the "absorbent-rich mixture of the first boiler 42".

This absorbent-rich mixture of the first boiler 42 feeds the second boiler 44 via the feed circuit 58 of the second boiler 44. In addition, said refrigerant fluid vapor generated in the first boiler 42 passes through the first sub-circuit 52a of the first refrigerant circuit 52 and passes through the heat exchange circuit 44a and the second boiler 44. Consequently, this refrigerant fluid vapor passing through the heat exchange circuit 44a of the second boiler 44 exchanges heat with the absorbent-rich mixture of the first boiler 42 as contained in the second boiler 44.

This has the effect of boiling or desorbing the remaining liquid refrigerant fluid contained in this absorbent-rich mixture coming from the first boiler 42 and contained in the second boiler 44.

The refrigerant fluid vapor generated in the second boiler 44 feeds the condenser 46 via the second refrigerant circuit 56 to feed the condenser 46. Furthermore, the refrigerant fluid vapor coming from the first boiler 42 leaves the heat exchange circuit 44a of the second boiler 44 in condensed form.

The liquid refrigerant fluid as generated in this way passes through the second sub-circuit 52b of the first refrigerant circuit 52 and is expanded by the first expander 54.

The refrigerant fluid vapor as generated in this way passes through the third sub-circuit 52c of the first refrigerant circuit 52 to feed the condenser 46.

Since the mixture remaining in the second boiler 44 is poor in refrigerant, it is referred to in the description below as "absorbent-rich mixture of the second boiler 44". This absorbent-rich mixture of the second boiler 44 feeds the absorber 50 via the feed circuit 70 for feeding absorbent-rich mixture.

The refrigerant fluid vapor contained in the condenser 46 coming from the third sub-circuit 52b is condensed by heat exchange with the heat exchange circuit 46a of the condenser 46 inserted in the air feed circuit 18 of the cathode 12b and of the burner 14a of the reformer 14. Since the air is at a lower temperature than said refrigerant fluid vapor, this vapor transfers the heat it contains to the air, thereby generating hot air. This hot air leaving the heat exchange circuit 46a of the condenser feeds the cathode 12b of the fuel cell 12 and the burner 14a of the reformer 14.

Furthermore, the liquid refrigerant fluid formed in the condenser 46 leaves said condenser 46 via the third refrigerant circuit 62 and feeds the evaporator 48 after being subjected to throttling through the second expander 64. The throttling has the effect of lowering the pressure of the liquid refrigerant fluid.

Furthermore, as mentioned above, the heat exchange circuit 48a of the evaporator 48 is inserted in the water circulation circuits 10 downstream from the outlet of the heated circuits 26b, 28b, 30b, and 32b of each heat exchanger 26, 28, 30, and 32. Thus, the water from the circulation circuit 10 leaving the heated circuit 26b, 28b, 30b, and 32b of each of the heat exchangers 26, 28, 30, and 32 passes through the heat exchange circuit 48a of the evaporator 48. Since this hot water from the circulation circuit 10 is at a higher temperature than the liquid refrigerant fluid contained in the evaporator 48 via the third refrigerant circuit 62, said hot water of the circulation circuit 10 transfers heat to the liquid refrigerant fluid contained in the evaporator 48.

This has the effect of evaporating the refrigerant fluid contained in the evaporator and of cooling the hot water of the circulation circuit, and this cooled hot water of the circulation circuit is referred to below in the present description as "cold water". The cold water then feeds the heating circuits 26a, 28a, 30a, and 32a of each of the condensers 26, 28, 30, and 32 so as to exchange heat with the heated circuits 26b, 28b, 30b, and 32b of each of the condensers 26, 28, 30 and 32.

Thereafter, this refrigerant fluid generated in the evaporator 48 passes through the fourth refrigerant fluid vapor circuit 66 to feed the absorber 50.

Since the heat exchange circuit 50a of the absorber 50 is inserted in the water feed circuit 68 of the reformer 14, this cold water, on vaporizing, picks up the heat given off by the absorption of the refrigerant fluid vapor coming from the evaporator 48. This then has the effect of condensing the refrigerant fluid vapor, which becomes mixed with the absorbent-rich mixture of the second boiler 44 coming from said boiler 44 via the feed circuit 70 for feeding absorbent-rich mixture. This mixture obtained in the absorber 50 constitutes the absorber diluted mixture and feeds the first boiler 42 via the feed circuit 72 of the first boiler 42 by means of the pump 74.

Furthermore, the first circuit 76a of the first heat exchanger 76 inserted in the circuit 70 for the absorbent-rich mixture absorbs the heat from this mixture and transfers it to its second circuit 76b inserted in the feed circuit 72 of the first boiler 42.

Likewise, the first circuit 78a of the second heat exchanger 78 inserted in the feed circuit 58 of the second boiler 44 picks up the heat of the absorbent-rich mixture of the first boiler 42 and transfers it to its second circuit 78b inserted in the feed circuit 72 of the first boiler 42.

The first and second heat exchangers 76 and 78 serve to reduce the quantity of heat that needs to be removed in the absorber 50.

Thus, by means of the installation of the invention, for 100 kilowatts (kW) of available refrigerating power, about 40 kW are used for recovering the water contained in the gas leaving the cathode, about 30 kW for recovering the water contained in the hydrogen-rich gas feeding the anode, about 25 kW for recovering the water contained in the hot combustion gas and about 5 kW for recovering the water contained in the gas leaving the anode.

Although the present invention is described with reference to a specific embodiment, it is clear that modifications and changes may be made to that example without going beyond the general scope of the invention as defined by the claims. In particular, individual characteristics of the embodiments shown and/or described may be combined in original embodiments. Consequently, the description and the drawing should be considered in an illustrative sense rather than a restrictive sense.

The invention claimed is:

1. An installation comprising:
a power module supplying electricity and giving off heat, the power module comprising at least one fuel cell provided with an anode and a cathode, and at least one reformer, the anode being fed with hydrogen by the reformer and the cathode being fed with oxygen, the fuel cell including a heat removal loop;
an absorption heat engine having a first boiler, a condenser, an evaporator, and an absorber, a heat exchange circuit of the first boiler being inserted in the heat removal loop of the fuel cell in order to cool it; and
a closed liquid circulation circuit, the closed liquid circulation circuit comprising at least one heat exchanger having a heating circuit thermally coupled to the power module and a heated circuit inserted in the closed liquid circulation circuit, the closed liquid circulation circuit exchanging heat with said heating circuit, thereby heating the liquid of the closed liquid circulation circuit, and wherein:
a heat exchange circuit of the evaporator is inserted in the closed liquid circulation circuit, said heat exchange circuit of the evaporator having said heated liquid of the closed liquid circulation circuit passing therethrough after it has passed through the heated circuit of said heat exchanger in order to cool the heated liquid of the closed liquid circulation circuit; and
the condenser of the absorption heat engine has a heat exchange circuit that is inserted in a circuit for feeding air to the cathode and/or to the reformer, in order to heat that air.

2. An installation according to claim 1, characterized in that the absorber of the absorption heat engine has a heat exchange circuit that is inserted in a circuit for feeding water to the reformer in order to heat that water.

3. An installation according to claim 1, characterized in that the absorption heat engine is a double-effect absorption heat engine, said double-effect absorption heat engine having a second boiler.

4. An installation according to claim 1, characterized in that the heating circuit of the at least one heat exchanger is connected to a circuit for exhausting gas from a burner of the reformer.

5. An installation according to claim 1, characterized in that the heating circuit of the at least one heat exchanger is connected to an anode feed circuit between the reformer and the anode.

6. An installation according to claim 1, characterized in that the heating circuit of the at least one heat exchanger is connected to a circuit for exhausting anode fluid and connected to the anode.

7. An installation according to claim 1, characterized in that the heating circuit of the at least one heat exchanger is connected to a circuit for exhausting cathode fluid and connected to the cathode.

8. An installation according to claim 4, characterized in that the at least one heat exchanger is a condenser.

9. An installation according to claim 5, characterized in that the at least one heat exchanger is a condenser.

10. An installation according to claim 6, characterized in that the at least one heat exchanger is a condenser.

11. An installation according to claim 7, characterized in that the at least one heat exchanger is a condenser.

12. An installation comprising:
a power module supplying electricity and giving off heat, the power module comprising at least one fuel cell provided with an anode and a cathode, and at least one reformer, the anode being fed with hydrogen by the reformer and the cathode being fed with oxygen, the fuel cell including a heat removal loop;
an absorption heat engine having a first boiler, a condenser, an evaporator, and an absorber, a heat exchange circuit of the first boiler being inserted in the heat removal loop of the fuel cell in order to cool it; and
a closed liquid circulation circuit, the closed liquid circulation circuit comprising at least one heat exchanger, which is a condenser, having a heating circuit thermally coupled to the power module by being connected to a circuit for exhausting gas from a burner of the reformer, and a heated circuit inserted in the closed liquid circulation circuit, the closed liquid circulation circuit exchanging heat with said heating circuit, thereby heating the liquid of the closed liquid circulation circuit, and wherein:
a heat exchange circuit of the evaporator is inserted in the closed liquid circulation circuit, said heat exchange circuit of the evaporator having said heated liquid of the closed liquid circulation circuit passing therethrough after it has passed through the heated circuit of said heat exchanger in order to cool the heated liquid of the closed liquid circulation circuit;
the condenser of the absorption heat engine has a heat exchange circuit that is inserted in a circuit for feeding air to the cathode and/or to the reformer, in order to heat that air;
the absorber of the absorption heat engine has a heat exchange circuit that is inserted in a circuit for feeding water to the reformer in order to heat that water; and a condensate liquid recovered in such a condenser feeds the reformer via a condensate circuit.

13. An installation according to claim 1, characterized in that the fuel cell is a high temperature proton exchange membrane fuel cell.

14. An installation according to claim 1, characterized in that it is an on-board installation.

15. An aircraft including an installation according to claim 1.

16. An installation comprising:
a power module supplying electricity and giving off heat, the power module comprising at least one fuel cell provided with an anode and a cathode, and at least one reformer, the anode being fed with hydrogen by the reformer and the cathode being fed with oxygen, the fuel cell including a heat removal loop;
an absorption heat engine having a first boiler, a condenser, an evaporator, and an absorber, a heat exchange circuit of the first boiler being inserted in the heat removal loop of the fuel cell in order to cool it; and
a closed liquid circulation circuit, the closed liquid circulation circuit comprising at least one heat exchanger, which is a condenser, having a heating circuit thermally coupled to the power module by being connected to an anode feed circuit between the reformer and the anode, and a heated circuit inserted in the closed liquid circulation circuit, the closed liquid circulation circuit exchanging heat with said heating circuit, thereby heating the liquid of the closed liquid circulation circuit, and wherein:
a heat exchange circuit of the evaporator is inserted in the closed liquid circulation circuit, said heat exchange circuit of the evaporator having said heated liquid of the closed liquid circulation circuit passing therethrough after it has passed through the heated circuit of said heat exchanger in order to cool the heated liquid of the closed liquid circulation circuit;
the condenser of the absorption heat engine has a heat exchange circuit that is inserted in a circuit for feeding air to the cathode and/or to the reformer, in order to heat that air;
the absorber of the absorption heat engine has a heat exchange circuit that is inserted in a circuit for feeding water to the reformer in order to heat that water; and
a condensate liquid recovered in such a condenser feeds the reformer via a condensate circuit.

17. An installation comprising:
a power module supplying electricity and giving off heat, the power module comprising at least one fuel cell provided with an anode and a cathode, and at least one reformer, the anode being fed with hydrogen by the reformer and the cathode being fed with oxygen, the fuel cell including a heat removal loop;
an absorption heat engine having a first boiler, a condenser, an evaporator, and an absorber, a heat exchange circuit of the first boiler being inserted in the heat removal loop of the fuel cell in order to cool it; and
a closed liquid circulation circuit, the closed liquid circulation circuit comprising at least one heat exchanger, which is a condenser, having a heating circuit thermally coupled to the power module by being connected to a circuit for exhausting anode fluid and connected to the anode, and a heated circuit inserted in the closed liquid circulation circuit, the closed liquid circulation circuit exchanging heat with said heating circuit, thereby heating the liquid of the closed liquid circulation circuit, and wherein:
a heat exchange circuit of the evaporator is inserted in the closed liquid circulation circuit, said heat exchange circuit of the evaporator having said heated liquid of the closed liquid circulation circuit passing therethrough after it has passed through the heated circuit of said heat exchanger in order to cool the heated liquid of the closed liquid circulation circuit;
the condenser of the absorption heat engine has a heat exchange circuit that is inserted in a circuit for feeding air to the cathode and/or to the reformer, in order to heat that air;
the absorber of the absorption heat engine has a heat exchange circuit that is inserted in a circuit for feeding water to the reformer in order to heat that water; and
a condensate liquid recovered in such a condenser feeds the reformer via a condensate circuit.

18. An installation comprising:
a power module supplying electricity and giving off heat, the power module comprising at least one fuel cell provided with an anode and a cathode, and at least one reformer, the anode being fed with hydrogen by the reformer and the cathode being fed with oxygen, the fuel cell including a heat removal loop;
an absorption heat engine having a first boiler, a condenser, an evaporator, and an absorber, a heat exchange circuit of the first boiler being inserted in the heat removal loop of the fuel cell in order to cool it; and
a closed liquid circulation circuit, the closed liquid circulation circuit comprising at least one heat exchanger, which is a condenser, having a heating circuit thermally coupled to the power module by being connected to a circuit for exhausting cathode fluid and connected to the cathode, and a heated circuit inserted in the closed liquid circulation circuit, the closed liquid circulation circuit exchanging heat with said heating circuit, thereby heating the liquid of the closed liquid circulation circuit, and wherein:
a heat exchange circuit of the evaporator is inserted in the closed liquid circulation circuit, said heat exchange circuit of the evaporator having said heated liquid of the closed liquid circulation circuit passing therethrough after it has passed through the heated circuit of said heat exchanger in order to cool the heated liquid of the closed liquid circulation circuit;
the condenser of the absorption heat engine has a heat exchange circuit that is inserted in a circuit for feeding air to the cathode and/or to the reformer, in order to heat that air;
the absorber of the absorption heat engine has a heat exchange circuit that is inserted in a circuit for feeding water to the reformer in order to heat that water; and
a condensate liquid recovered in such a condenser feeds the reformer via a condensate circuit.

\* \* \* \* \*